United States Patent Office 2,782,163
Patented Feb. 19, 1957

2,782,163
EMULSION DRILLING FLUID COMPOSITION AND METHOD

Doyne L. Wilson, Pasadena, Calif., assignor to Oil Base, Inc., Compton, Calif., a corporation of California No Drawing. Application November 14, 1952,
Serial No. 320,604

12 Claims. (Cl. 252—8.5)

This invention relates to drilling fluid compositions and has particular reference to emulsion drilling fluids of the oil-in-water type, emulsifiers for such fluids and to a method for drilling oil and gas wells.

Emusion drilling fluids find wide application in the drilling of oil and gas wells and preferably are of the oil-in-water type, formed by emulsifying a mineral oil, crude or refined, with a clay-water drilling fluid or mud by means of a suitable emulsifier. Emulsifiers heretofore used comprise, for example, sodium oleate, sodium "tallate," calcium ligninsulfonate, sodium carboxymethyl cellulose, etc.

Emulsion drilling fluids of the oil-in-water type are, in a sense, intermediate between water base drilling fluids such as clay-water muds and oil base drilling fluids. The general characteristics of emulsion drilling fluids more nearly approach those of the water base drilling fluids however. They are subject to the same contaminants and respond to the same additives. Despite this, emulsion muds have a number of advantages over water base muds and, in some respects, over oil base muds.

Compared with water base muds relatively low fluid losses are possible with emulsion drilling fluids, rendering them superior to water base drilling fluids in forming a paper-thin, tough, pliable mud cake on the walls of the well which lessens the danger of washouts and stuck pipe, maintains the hole closer to gauge, eliminates "balling" of the drill bit, minimizes "swabbing" action when the drill pipe is removed from the hole, and which functions to lubricate and cool the bit while the drilling operation progresses.

As compared with oil base drilling fluids, the emulsion type fluids are generally cleaner to work with, are less expensive and, possibly more important, excellent electric logs may be obtained in emulsion drilling fluids with normal electrical survey equipment, whereas such electric logs cannot be obtained with normal oil base drilling fluids. This ability to obtain reliable electric logs is of prime importance in a wildcat well where the operator desires a more efficient drilling fluid than a clay-water mud but does not wish to use the special electrical equipment required to obtain electric logs with an oil base fluid.

Certain of the heretofore used emulsion drilling fluids are stabilized with emulsifiers which are chemically reactive in the presence of contaminants such as, for example, ions of calcium and magnesium, brines, etc., and are thus subject to deterioration and physical separation, resulting in loss of the desirable properties of the fluid. Sodium oleate and sodium "tallate" are examples of this type of emulsifier.

Certain other of the emulsion drilling fluids heretofore proposed and used require activation by reaction with sodium hydroxide before emulsification may occur. This results in additional costs for material and labor, and moreover presents a hazard which would not otherwise be involved. Additionally, this type of emulsion is not entirely satisfactory at moderate pH (7.5 to 9.5) ranges and requires a higher pH for the best results. Sub-bituminous coals are examples of this type of emulsifier. Emulsion drilling fluids containing starch as the emulsifier have been proposed and used, but such fluids are subject to bacterial fermentation unless protected by a high pH or a bactericide.

One of the principal objects of this invention is then to provide an emulsion drilling fluid composition which is not subject to the disadvantages of the prior art fluids as set forth above.

Another object of this invention is to provide an emulsifier composition for use in producing emulsion drilling fluids.

Another object of this invention is to provide an emulsifier for emulsion drilling fluids which is adapted to be prepared in powder form and readily incorporated into the fluid at the well site.

Another object of this invention is to provide an emulsifier for emulsion drilling fluids which is effective over wide pH ranges and under substantially all conditions encountered during well drilling operations.

Another object of this invention is to provide a method for drilling oil and gas wells, in which method is utilized the novel emulsion drilling fluids and emulsifiers of this invention.

Other objects and advantages of this invention, it is believed, will be readily apparent from the following detailed description of preferred embodiments thereof.

Briefly, the emulsifier of this invention comprises a composition containing at least about 15 percent by weight of sodium humate and at least about 15 percent by weight of lignite, the sodium humate being present in proportion of from about 0.5 to 3 parts by weight to one part of lignite.

In one embodiment of the invention, the emulsifier comprises a composition including sodium humate, lignite, quebracho, tetrasodium pyrophosphate and calcium carbonate. It has been found that the undesirable properties of emulsion drilling fluids heretofore used may be avoided with such emulsifiers. Preferably, the emulsifier of this embodiment of the invention comprises the following ingredients present in the percentage ranges indicated:

| | Percent by weight |
|---|---|
| Sodium humate | 15–30 |
| Lignite | 15–30 |
| Quebracho | 15–30 |
| Tetrasodium pyrophosphate | 5–0 |
| Calcium carbonate | 50–10 |

The sodium humate in the composition acts as an emulsification agent at moderate or high pH ranges, whereas at high pH ranges, the lignite functions primarily as a source of additional humic acid which reacts with the sodium hydroxide normally already present in the high pH clay-water drilling fluid to provide additional sodium humate as needed.

The unreacted lignite particles function as a bridging agent to assist in obtaining lower fluid loss. Preferably, and in order to enhance the bridging action of the lignite, the lignite particle sizes are distributed over a fairly wide range. A preferred screen analysis of the lignite material is as follows:

| Screen size (mesh): | Percent passing |
|---|---|
| 32 | 99.2 |
| 65 | 97.9 |
| 80 | 97.5 |
| 100 | 96.4 |
| 170 | 88.7 |
| 200 | 85.3 |
| 270 | 76.4 |
| 325 | 65.0 |

The primary purpose of the quebracho is to provide a clay dispersant in that the quebracho is adsorbed onto the clay particles and prevents their alignment by electrical charges with subsequent flocculation and the formation of undesirable gels and viscosities. The quebracho also functions as an emulsifier at high pH ranges, and additionally prevents a "break-over" viscosity peak upon conversion of sodium clay to calcium clay in the formation of lime base muds.

The tetrasodium pyrophosphate is a desirable ingredient of compositions in accordance with this invention in that it functions as a water softener, controls or buffers the pH of moderate pH muds and is a clay dispersant and viscosity reducer.

The calcium carbonate is primarily added as a diluent but additionally functions as a bridging agent and tends to buffer the mud against a low pH. It also serves to prevent excessive weight reduction of the clay-water drilling fluid due to the additions of large percentages of oil as utilized in many cases. Further it provides readily acidizable material in the emulsion drilling fluid, should acidizing of the mud cake be desirable.

The following specific examples are illustrative of emulsifier compositions in accordance with this invention, but it is not intended to limit the invention thereto:

Example 1

| | Percent by weight |
|---|---|
| Sodium humate | 15 |
| Lignite | 15 |
| Quebracho | 15 |
| Tetrasodium pyrophosphate | 5 |
| Calcium carbonate (98% through 325 screen) | 50 |

The lignite of the above example was obtained from deposits in the vicinity of Ione, California, and the sodium humate was obtained from lignite of this type. The emulsifier compositions of Example 1 is highly suitable for general emulsifier use in emulsion drilling fluid compositions, especially moderate pH fluids and lime base fluids wherein only relatively mild contamination is encountered.

Example 2

| | Percent by weight |
|---|---|
| Sodium humate | 75 |
| Lignite | 25 |

The emulsifier of Example 2 has been found to be adequate for use in moderate pH emulsion drilling fluids.

Example 3

| | Percent by weight |
|---|---|
| Sodium humate | 50 |
| Lignite | 25 |
| Quebracho | 25 |

The emulsifier composition of Example 3 is designed primarily for use in lime base or high pH drilling fluids.

Suitable emulsions have been prepared in which the content of the oil phase ranges from 5 to 50 percent by volume and in which the concentration of emulsifier, as set forth above, ranges from 5 to 20 pounds per barrel (42 gallons) of emulsion. Suitable oils are diesel oil, stove oil, gas oil, fuel oils, kerosenes, crude oils and the like. It is preferred to use in emulsion drilling fluids oils which range in gravity from 20 to 35° API and which have flash points in excess of 130° F.

A specific example of a lime base emulsion fluid in accordance with this invention is as follows:

Example 4

| | | |
|---|---|---|
| Clay-water mud (80 lbs./cu. ft.) | bbl | 0.8 |
| 30° API crude oil | bbl | 0.2 |
| Emulsifier of Example 1 | lbs | 10 |
| Caustic soda | lbs | 0.5 |
| Calcium hydroxide | lbs | 1 |

In formulating the above Example 4, the clay-water mud is agitated in a suitable container, and during the agitation, the emulsifier, which is in powder form, is added. The oil is then gradually stripped in, and agitation is continued until a smooth homogeneous emulsion is obtained. The caustic soda, dissolved in a small volume of water, is slowly added to the emulsion, then the lime is gradually added and agitation is continued for a period of several minutes after the addition of all the lime.

The composition of Example 4 has been found to be adequate in areas of mild contamination. For more severe contamination, a composition prepared in accordance with the following example has been found to be preferable:

Example 5

| | | |
|---|---|---|
| Clay-water mud (80 lbs./cu. ft.) | bbl | 0.8 |
| 30° API crude oil | bbl | 0.2 |
| Emulsifier of Example 1 | lbs | 10 |
| Quebracho | lbs | 2 |
| Caustic soda | lb | 1 |
| Calcium hydroxide | lbs | 2 |

The composition of Example 5 is prepared in a manner similar to that of Example 4, but preferably the quebracho is added prior to the addition of the caustic soda and the lime. If desired, the caustic soda and quebracho may be reacted in an aqueous solution prior to addition to the emulsion.

The following table represents the physical properties of several drilling fluids made up of clay-water mud (weighing 80 lbs. per cu. ft.), a 27° API crude oil and the emulsifier of Example 1, wherein the relative proportions of ingredients were varied as indicated:

| Sample | 27° Crude Oil, Percent by Volume | Emulsifier, Lbs./Bbl. Emulsion | Fluid Loss, cc., API | Gel Strength (Gms.) | | Viscosity, Cps. (100° F.) | Filter Cake, Inches |
|---|---|---|---|---|---|---|---|
| | | | | 0' | 10' | | |
| 1 | 0 | 0 | 17.5 | 1 | 3 | 16 | 4/32 |
| 2 | 9 | 5 | 5.8 | 1 | 1 | 9 | 1/32 |
| 3 | 16 | 5 | 4.9 | 1 | 1 | 10 | 1/32 |
| 4 | 23 | 5 | 3.8 | 1 | 1 | 12 | 1/32 |
| 5 | 30 | 5 | 3.2 | 1 | 1 | 15 | 1/32 |
| 6 | 9 | 10 | 4.0 | 1 | 1 | 8 | 1/32 |
| 7 | 16 | 10 | 3.2 | 1 | 1 | 9 | 1/32 |
| 8 | 23 | 10 | 2.6 | 1 | 1 | 12 | 1/32 |
| 9 | 30 | 10 | 2.2 | 1 | 1 | 15 | 1/32 |

While the particular examples of the invention herein described are well adapted to carry out the objects of the invention, various modifications and changes may be made and this invention is of the scope set forth in the appended claims.

I claim:

1. An alkaline emulsion drilling fluid comprising a clay-water mud, a mineral oil, an emulsifier comprising at least about 15% of sodium humate and at least about 15% of lignite by weight, the sodium humate being present in proportions of from about 0.5 to 3 parts by weight to one part of lignite, said emulsifier being present in sufficient concentration to form a stable oil-in-water emulsion, and an alkali compound providing at least a part of the alkalinity of said alkaline emulsion drilling fluid.

2. An alkaline emulsion drilling fluid comprising a clay-water mud, a mineral oil, an emulsifier comprising at least about 15% of sodium humate and at least about 15% of lignite by weight, the sodium humate being present in proportions of from about 0.5 to 3 parts by weight to one part of lignite, said emulsifier being present in a concentration of from about 5 to about 20 pounds per barrel of drilling fluid, and an alkali compound providing at least a part of the alkalinity of said alkaline emulsion drilling fluid.

3. An emulsion drilling fluid comprising a clay-water mud, a mineral oil, caustic soda, calcium hydroxide, and an emulsifier for said emulsion drilling fluid, said emulsifier comprising at least about 15% of sodium humate and at least about 15% of lignite by weight, the sodium humate being present in proportions of from about 0.5 to 3 parts by weight to one part of lignite, said emulsifier being present in sufficient concentration to form a stable oil-in-water emulsion.

4. An emulsion drilling fluid comprising a clay-water mud, a mineral oil, caustic soda, calcium hydroxide, and an emulsifier for said emulsion drilling fluid, said emulsifier comprising at least about 15% of sodium humate and at least about 15% of lignite by weight, the sodium humate being present in proportions of from about 0.5 to 3 parts by weight to one part of lignite, and said emulsifier being present in a concentration of from about 5 to about 20 pounds per barrel of drilling fluid.

5. An emulsion drilling fluid comprising a clay-water mud, a mineral oil, caustic soda, calcium hydroxide, and an emulsifier for said emulsion drilling fluid, said emulsifier comprising from about 15% to about 30% of sodium humate, from about 15% to about 30% of lignite, from about 15% to about 30% quebracho, from about 0% to about 5% of tetrasodium pyrophosphate, and from about 10% to about 50% of calcium carbonate, said emulsifier being present in sufficient concentration to form a stable oil-in-water emulsion.

6. In a process for drilling wells with well drilling tools wherein there is circulated a drilling fluid, the steps comprising adding to the well an alkaline emulsion drilling fluid comprising a clay-water mud, a mineral oil, an emulsifier comprising at least about 15% of sodium humate and at least about 15% of lignite by weight, the sodium humate being present in proportions of from about 0.5 to 3 parts by weight to one part of lignite, said emulsifier being present in sufficient concentration to form a stable oil-in-water emulsion, an alkali compound providing at least a part of the alkalinity of said alkaline emulsion drilling fluid, and circulating said drilling fluid through the well during the drilling thereof.

7. In a process for drilling wells with well drilling tools wherein there is circulated a drilling fluid, the steps comprising adding to the well an emulsion drilling fluid comprising a clay-water mud, a mineral oil, caustic soda, calcium hydroxide, and an emulsifier for said emulsion drilling fluid, said emulsifier comprising from about 15% to about 30% of sodium humate, from about 15% to about 30% of lignite, from about 15% to about 30% of quebracho, from about 0% to about 5% of tetrasodium pyrophosphate, and from about 10% to about 50% of calcium carbonate, said emulsifier being present in sufficient concentration to form a stable oil-in-water emulsion, and circulating said drilling fluid through the well during the drilling thereof.

8. An alkaline emulsion drilling fluid comprising a clay-water mud, a mineral oil, an emulsifier comprising about 50% of sodium humate, about 25% of lignite, and about 25% of quebracho, said emulsifier being present in sufficient concentration to form a stable oil-in-water emulsion, and an alkali compound providing at least a part of the alkalinity of said alkaline emulsion drilling fluid.

9. An alkaline emulsion drilling fluid comprising a clay-water mud, a mineral oil, and an emulsifier comprising at least about 15% by weight of sodium humate, at least about 15% by weight of lignite, the sodium humate being present in proportions of from about 0.5 to 3 parts by weight to one part by weight of lignite, tetrasodium pyrophosphate, and calcium carbonate, said emulsifier being present in sufficient concentration to form a stable oil-in-water emulsion.

10. An alkaline emulsion drilling fluid comprising a clay-water mud, a mineral oil, and an emulsifier comprising at least about 15% by weight of sodium humate, at least about 15% by weight of lignite, the sodium humate being present in proportions of from about 0.5 to 3 parts by weight to 1 part by weight of lignite, tetrasodium pyrophosphate, and calcium carbonate, said emulsifier being present in a concentration of from about 5 to about 20 pounds per barrel of drilling fluid.

11. An alkaline emulsion drilling fluid comprising a clay-water mud, a mineral oil, and an emulsifier comprising at least about 15% by weight of sodium humate, at least about 15% by weight of lignite, the sodium humate being present in proportions of from about 0.5 to 3 parts by weight to one part by weight of lignite, quebracho, tetrasodium pyrophosphate, and calcium carbonate, said emulsifier being present in sufficient concentration to form a stable oil-in-water emulsion.

12. In a process for drilling wells with well-drilling tools wherein there is circulated a drilling fluid, the steps comprising: adding to the well an alkaline emulsion drilling fluid comprising a clay-water mud, a mineral oil, and an emulsifier comprising at least about 15% by weight of sodium humate, at least about 15% by weight of lignite, the sodium humate being present in proportions of from about 0.5 to 3 parts by weight to 1 part by weight of lignite, tetrasodium pyrophosphate, and calcium carbonate, said emulsifier being present in sufficient concentration to form a stable oil-in-water emulsion, and circulating said drilling fluid through the well during the drilling thereof.

References Cited in the file of this patent
UNITED STATES PATENTS

| | | |
|---|---|---|
| 2,531,662 | Beck | Nov. 28, 1950 |
| 2,555,794 | Henkes | June 5, 1951 |
| 2,620,300 | Given | Dec. 2, 1952 |
| 2,650,197 | Rahn | Aug. 25, 1953 |

OTHER REFERENCES

Rogers-Composition and Properties of Oil Well Drilling Fluids, pages 414 to 416. Pub. 1948 by Gulf Pub. Co. of Houston, Texas.